(12) United States Patent
Muchherla et al.

(10) Patent No.: US 11,829,623 B2
(45) Date of Patent: Nov. 28, 2023

(54) USING INCOMPLETE SUPER BLOCKS FOR INCREASED WRITE PERFORMANCE

(71) Applicant: Micron Technology, Inc., Boise, ID (US)

(72) Inventors: Kishore Kumar Muchherla, Fremont, CA (US); Ashutosh Malshe, Fremont, CA (US); Jianmin Huang, San Carlos, CA (US); Jonathan S. Parry, Boise, ID (US); Xiangang Luo, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/678,459

(22) Filed: Feb. 23, 2022

(65) Prior Publication Data
US 2023/0195341 A1  Jun. 22, 2023

Related U.S. Application Data (60) Provisional application No. 63/292,820, filed on Dec. 22, 2021.

(51) Int. Cl.
*G06F 3/06* (2006.01)

(52) U.S. Cl.
CPC ............ *G06F 3/064* (2013.01); *G06F 3/0613* (2013.01); *G06F 3/0619* (2013.01); *G06F 3/0659* (2013.01); *G06F 3/0679* (2013.01)

(58) Field of Classification Search
CPC ...... G06F 3/064; G06F 3/0613; G06F 3/0659; G06F 3/0679
See application file for complete search history.

(56) References Cited

U.S. PATENT DOCUMENTS

| | | | | |
|---|---|---|---|---|
| 2008/0183949 | A1* | 7/2008 | Ly | G11C 16/10 711/170 |
| 2011/0252187 | A1* | 10/2011 | Segal | G06F 12/0246 711/E12.008 |
| 2014/0250257 | A1* | 9/2014 | Khan | G06F 11/1012 711/103 |
| 2021/0011646 | A1* | 1/2021 | Nystad | G06T 1/60 |
| 2021/0335432 | A1* | 10/2021 | Manganelli | G11C 29/52 |

* cited by examiner

*Primary Examiner* — Eric Cardwell
(74) *Attorney, Agent, or Firm* — Lowenstein Sandler LLP (57) ABSTRACT

A system can include a memory device, and a processing device, operatively coupled with the memory device, to perform operations of writing a first portion of data to one or more complete translation units of the memory device using a first number of logical levels per memory cell and writing a second portion of the data to one or more incomplete translation units of the memory device using the first number of logical levels per memory cell. The operations can also include writing a third portion of the data to one or more complete translation units of the memory device using a second number of logical levels per memory cell that exceeds the first number of logical levels per memory cell.

20 Claims, 6 Drawing Sheets

USING INCOMPLETE SUPER BLOCKS FOR INCREASED WRITE PERFORMANCE

RELATED APPLICATIONS

This application claims the benefit of U.S. Provisional Patent Application No. 63/292,820, filed Dec. 22, 2021, entitled "Using Incomplete Super Blocks for Increased Write Performance" which is incorporated by reference herein.

TECHNICAL FIELD

Embodiments of the disclosure relate generally to memory sub-systems, and more specifically, relate to using incomplete super blocks for increased write performance.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2. is a schematic diagram of a memory device in accordance with some embodiments of the present disclosure.

DETAILED DESCRIPTION

Aspects of the present disclosure are directed to using incomplete super blocks for increased write performance in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Memory systems in modern computing environments are frequently tailored to emphasize particular operative features. For example, in some environments, such as those for mobile computing, audio/video recording, and performance benchmarking, aspects such as performance, network activity, and battery usage may be prioritized as compared to other systems and computing environments. In these cases, maximizing storage capacity, however, may not be as important since, due to network connectivity providing the ability to transfer data elsewhere, remote storage of significantly larger capacity than that available locally may be available. Therefore, in some of these environments, the local storage may be used to store data that is received continuously without being frequently modified or to store data for a short duration of time before it is be transferred to a remote storage location. With increasing data throughput and bandwidth capabilities, large amounts of data may be written to the local memory storage. Thus, system performance and write performance in particular can be a critical requirement for these systems.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of cells arranged in a two-dimensional grid. Memory cells are etched onto a silicon wafer in an array of columns connected by conductive lines (also hereinafter referred to as bitlines) and rows connected by conductive lines (also hereinafter referred to as wordlines). A wordline can refer to a conductive line that connects control gates of a set (e.g., a row) of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

Data blocks in a memory system can include multiple memory cells. Each of the memory cells can store one or more bits of data. Data can be sent by other devices and received for storage on the memory system. In some cases, a block of the memory system can be configured as single level cell (SLC) memory for being written to in SLC mode where each memory cell of the SLC memory can be programmed with a single bit of data. For storing one bit of data in the SLC memory, a range of possible voltage levels of a memory cell can be divided into two ranges. For example, the two ranges can include a first range of threshold voltages that corresponds to one logical state (e.g., the logical data value "1") and a second range of threshold voltages that corresponds to another logical state (e.g., the logical data value "0.")

The data blocks in the memory system can be configured as higher density memory, such as multi-level cell (MLC) memory for being written to in MLC mode where each cell can be programed by storing two bits per memory cell, three bits per memory cell, four bits per memory cell, or more bits per memory cell. In some cases data blocks initially configured as SLC memory can be reconfigured as MLC memory. Data can be stored in an MLC memory device based on an overall range of voltages that is divided into a number of distinct threshold voltage ranges for the memory cells representative of respective logical states. Accordingly, each distinct threshold voltage range can correspond to a predetermined value representing the data stored at the memory cell. For example, some MLC cells can store two bits of data, others referred to triple-level cell (TLC) memory can store three bits of data by being written to in TLC mode, while still others referred to as quad-level cell (QLC) memory can store four bits of data by being written to in QLC mode. As used herein the term "multi-level cell memory" can include any memory configured to store more than one bit of data per cell. In certain memory devices, including non-volatile memory devices such as negative-and (NAND) memory devices, system performance requirements are becoming more aggressive, such as demands for shorter times for programming to (tProg) and reading from (tR) NAND cells of the memory devices. Thus, these memory devices tend to include a portion of the NAND array which can be utilized as SLC cache in which to program SLC data (and from which to read the SLC data) before transferring the SLC data in the SLC cache to multiple-level cell MLC memory, such as TLC memory, or QLC memory.

In certain multi-plane memory devices such as memory devices with memory cells arranged in an array ("a memory array") of worldliness and bitlines, there can be a one-to-one correspondence between a memory array associated with each plane and other related circuitry, such as for example, an independent plane driver circuit, with bitline bias circuitry, a sense amplifier, and a number of registers. In some cases, the independent plane driver circuits allow for parallel and concurrent memory access operations to be performed on the respective memory arrays of each plane of the multi-plane memory device. In devices capable of such parallelism, the logical address space can include multiple translation units (TU), such that each TU can include one or more logical units (e.g., logical pages, logical blocks, etc.). In some examples, a TU can be a super block that includes a predefined number (e.g., 12) of blocks. As used herein a super block can refer to a TU that includes one block from each plane on a set of dies of a memory device. Each of the blocks of the super block can be located on a separate plane having independent circuitry allowing parallel operations to be performed on all the blocks of the super block. Accordingly, the use of parallel memory operations can provide increased memory performance proportional to the number of parallel operations that can be performed.

Despite the smaller capacity of SLC memory block configuration, it may include some benefits including superior performance and reliability compared to MLC/TLC/QLC memory configurations. Thus, certain systems operate by initially writing data associated with memory write commands to data blocks configured as SLC memory and later migrate that data to data blocks configured as MLC/TLC/QLC memory as noted above or simply write an initial amount of data more quickly in SLC mode and then a remaining amount in TLC mode. The performance benefits of using SLC memory in this manner, however, are offset by an increase in total tProg and an increase program and erase (P/E) cycles, since three SLC cells are written and erased once that data is migrated to one TLC cell for example and tProg in SLC mode is less than tProg in TLC mode. This leads to a longer total time needed to write the data and also leads to a decrease in endurance for the memory device.

Furthermore, in some systems, as operations are performed on the blocks of the memory device, some blocks accumulate errors, become defective or otherwise unusable. As blocks within a plane of a memory device become defective they become no longer available for parallelism across planes (i.e., no longer available for parallel concurrent operations using multiple independent plane driver circuits on multiple corresponding planes). Accordingly, the accumulation of defective blocks leads to a reduction in the number of complete super blocks being able to be formed and used for parallel operations. This leads to the creation of incomplete super block and orphan blocks (i.e., blocks that do no form part of a complete super block) across the various planes in the memory device. Accordingly, such use may result in unused capacity and decreased write performance due to the accumulation of defective blocks, unused orphan blocks and incomplete super blocks.

Aspects of the present disclosure address the above and other deficiencies with a memory sub-system that can reconfigure incomplete super blocks into complete super blocks and can perform operations on incomplete super blocks. More specifically, embodiments of the present disclosure can reassign orphan blocks within a plane from one incomplete super block to fill/complete another incomplete super block to complete the second super block allow for full parallelism on the completed super block (i.e., allow for a maximum number of parallel operations to be performed on the complete super block). Moreover, in embodiments of the present disclosure, data is written in SLC mode to complete super blocks and then to incomplete super blocks prior to being written in TLC mode, or another mode (e.g., MLC/QLC) to complete super blocks. For the purposes of this disclosure, wherever TLC mode is referenced, it can be replaced with MLC mode, QLC mode, or modes using higher number of logical levels per cell. In this manner a larger amount of data is written to the memory device at a faster rate than in various other systems.

Technical advantages of the embodiments of the present disclosure include, but are not limited to, reduction of the number of unused orphan blocks and reduction of the number of unused super blocks caused by the presence of defective blocks. Furthermore, embodiments of the present disclosure increase the overall write performance of a memory device as SLC mode continues being used to write to blocks in incomplete super blocks for as long as the rate of writing the data remains higher than the rate of writing data to complete super blocks in TLC mode. Accordingly, the total time needed to fill a memory device to nominal capacity is decreased. These benefits can be particularly beneficial in operating environments that produce a steady stream of data to be written to a memory device, such as for example, performance benchmarking or high volume media storage.

Figure 1:
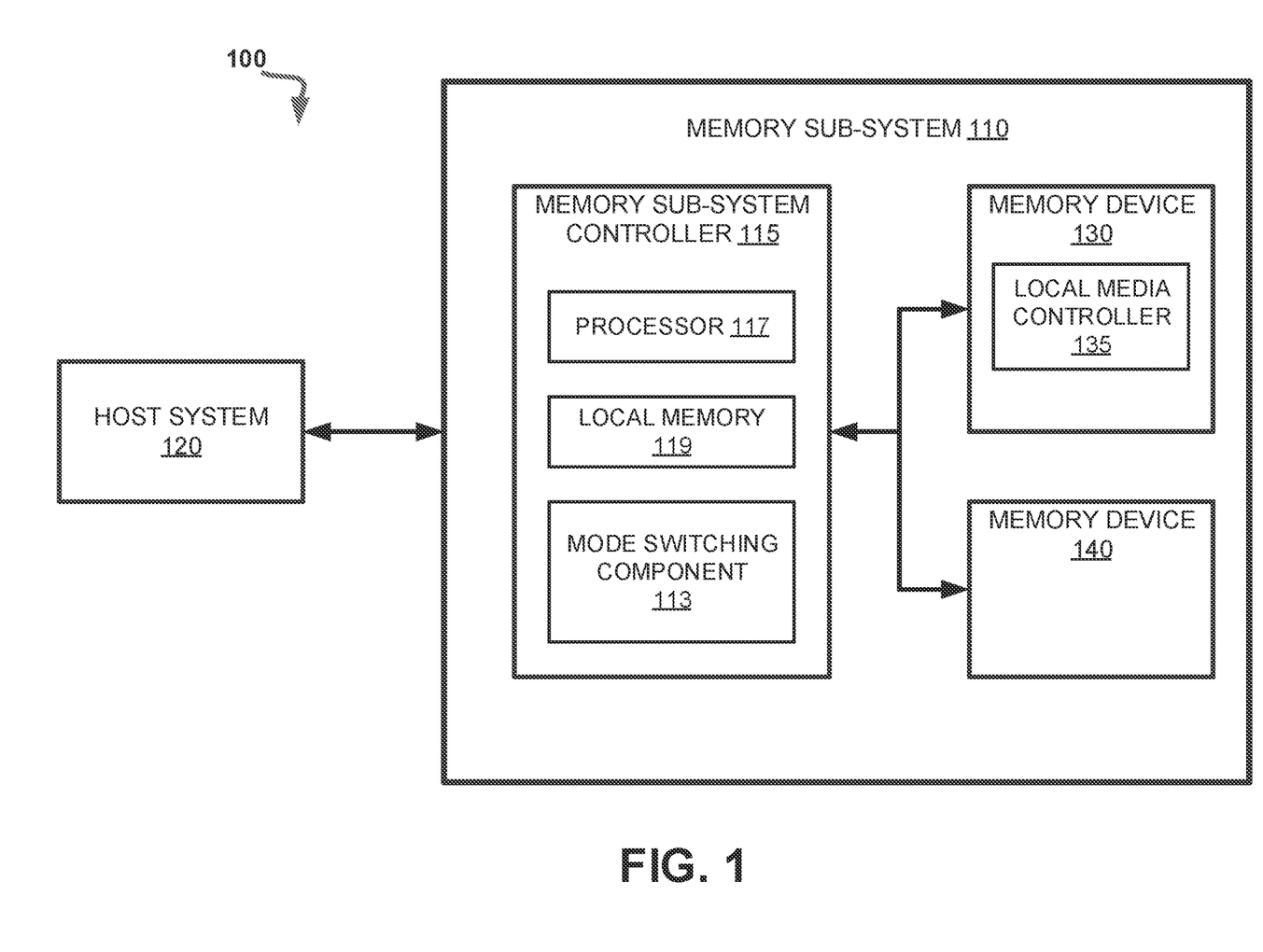
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a mode switching component (MSC) 113 that can manage the composition of TUs by assigning and reassigning blocks located on planes of a memory device to be included in particular TUs. The MSC 113 can also switch between logical level modes for performing operations on memory device 130 (e.g., switching between SLC mode and TLC mode). In some embodiments, the memory sub-system controller 115 includes at least a portion of the MSC 113. In some embodiments, the MSC 113 is part of the host system 110, an application, or an operating system. In other embodiments, local media controller 135 includes at least a portion of MSC 113 and is configured to perform the functionality described herein.

In some embodiments, the MSC 113 can be communicatively connected to memory device 130 either directly or through sub-system controller 115. The features and capabilities of MSC 113 can be more clearly understood by reference to FIG. 2 which depicts a schematic diagram of a memory device 200 which can be understood to be a version of memory device 130 in accordance with one embodiment of the invention. As can be seen, the memory device 200 can include a number of dies 201a, 201b, and 201c. Each die 201a, 201b, and 201c can have several planes 202a, 202b, 202c, 202d each of which respectively has multiple blocks 220.

Each of the blocks 220 can be categorized as useable blocks 223a, 223b and unusable or defective blocks 221. Useable blocks can be understood to be blocks on which operations (e.g., read and write operations) can be reliably performed (i.e., blocks having less than a predetermined threshold amount of errors). Similarly, unusable defective blocks 221 can be understood to be blocks on which memory operations cannot reliably be performed due to the accumulation of errors causing the block to be defective or otherwise not suitable for reliably storing data.

Blocks 220 can be grouped into super blocks, which are examples of translation units (TUs). Each TU can be made up of multiple blocks 220 such that each block is from a different plane 202a, 202b, 202c, 202d. A complete TU 203a, 203b is a TU all the blocks of which are usable blocks 223a, 223b, 223c, 223d. An incomplete TU 204a, 204b, 204c is a TU having at least one defective block 221. The remaining blocks in an incomplete TU 204a, 204b, 204c (i.e., the usable blocks that do not form part of a complete TU) can be referred to as orphan blocks 225 since they do not belong to a complete TU 203a, 203b due to the presence of one or more of the defective blocks 221 in the TU.

Notably, blocks 220 from one TU can be reassigned to form part of another TU. In this manner, usable blocks 223a, 223b, 223c, 223d from incomplete TUs 204a, 204b, 204c can be reassigned to other TUs to replace a defective block in the same plane. For example, usable block 223a from incomplete TU 204c can be reassigned to another TU and replace a defective block in the same plane to form a complete TU 203c. Assignment and reassignment of blocks to respective super blocks can be tracked in metadata containing an association of a block and a super block. Similarly, usable block 223b from incomplete TU 204a can replace a defective block in plane 202d to form a complete TU 203a. In another example, usable blocks 223c and 223d from incomplete TU 204b can be reassigned to another TU and replace defective blocks in planes 202b and 202c, respectively, to form complete TU 203b. In this manner, a set 324 of complete TUs can be formed by using usable blocks 223a, 223b, 223c, 223d from incomplete TUs 204a, 204*b*, 204*c* to replace defective blocks. Analogously, usable blocks such as orphan blocks 225 can be reassigned from one incomplete TU 204*c* to another to create an incomplete TU with fewer defective blocks.

In the depicted embodiment, each of the three dies includes four planes resulting in twelve planes in total and each plane includes nine blocks resulting in thirty six blocks on each die. Because each complete TU can be include one usable from each plane and each plane can be concurrently accessed for the performance of read/write operations, an entire complete TU can be accessed using full parallelism (i.e., the performance of operations on each of the constituent blocks of a complete TU in parallel). Accordingly, a volume of data equivalent to the capacity of the entire complete TU can be written to the TU simultaneously. However, if a TU is incomplete, the parallelism capability is reduced due to the increased number of defective blocks in the TU preventing the achievement of full parallelism. The reduction in performance of writing to a particular TU can be directly proportional to the number of defective blocks. For example, if two blocks are defective in a TU made up of twelve blocks, the reduction in write speed to that TU would be approximately 17%. Accordingly, it is beneficial to maximize the number of complete TUs and minimize the number of defective blocks in incomplete TUs to take advantage of parallelism and maximize performance.

Referring now to FIG. 1 in conjunction with FIG. 2, in some embodiments, the MSC 113 can form TUs on memory device 130 by assigning blocks from each plane to constitute a particular TU. Since errors and defects accumulate in blocks during the operation of a memory device, defective blocks can become present within TUs and reduce the number of parallel operations that can be performed in a given TU. It should be understood that as the number of defective blocks accumulates so does the number of orphan blocks 223 which are useable blocks remaining on the other planes of a TU after one or more blocks in the TU become defective. Accordingly, the MSC 113 can reassign usable blocks 223*a*, 223*b* (including orphan blocks 225) from incomplete TUs to from complete TUs. Furthermore, MSC 113 can assign usable blocks 223*a*, 223*b* (including orphan blocks 225) from one incomplete TU to another incomplete TU to maximize the number of usable blocks in a given TU and maximize the number of parallel operations that can be performed thereon. To maximize the benefit obtained from parallelism, it would be beneficial to form incomplete translation units with as many usable blocks as possible.

In some embodiments, the MSC 113 can receive data to be stored on the memory device 130 from host system 120 or from other components of the memory sub-system 110. The MSC 113 can divide the data into portions and determine the TUs and blocks where the portions of the data are to be stored. Notably, the MSC 113 can switch between various different logical level operation modes. For example, in some embodiments MSC 113 can switch between operating in SLC mode and TLC mode or another MLC mode. Accordingly, MSC 113 can configure the blocks of memory device 130 to write data in SLC or MLC respectively. It should be understood that switching between different logical level operation modes entails reconfiguring cells to write data in a corresponding number of logical levels (e.g., configuring single level cells to operate as triple level cells).

Consequently, in some embodiments, the MSC 113 can determine and control the rate at which data is written on the memory device 130 (i.e., the write speed) by switching between various logical level operation modes. For example, in an embodiment, the rate at which data is written in complete TUs (i.e., full super blocks) on the memory device 130 when operating in SLC mode can be four times higher than the rate at which the data is written in complete TUs on the memory device 130 when operating in TLC mode. Another way that MSC 113 can determine and control the rate at which data is stored on the memory device 130 is by controlling whether data is being stored in (i.e., written to) complete TUs or incomplete TUs (i.e., incomplete super blocks). If data is being written to a complete TU, then parallel operations can be performed on all the blocks of the TU (i.e., using full parallelism) and a maximal write performance can be obtained. However, if data is being written to an incomplete TU, then the write performance will be reduced proportionally to the number of defective blocks in the TU since operations cannot be performed on the defective blocks in the TU concurrently with the operations being performed on the usable blocks in the TU.

Accordingly, the MSC 113 can detect defective blocks and determine the number of defective blocks and, consequently, the number of orphan blocks in a TU. By extension, the MSC can also determine the number of defective and orphan blocks as well as complete and incomplete TUs in the memory device 130. Notably, unlike in traditional approaches, when the MSC 113 detects defective blocks in a TU, instead of leaving the incomplete TU unused or making it unavailable for the performance of read/write operations, the MSC 113, can instruct operations to be performed on the orphaned usable blocks in the incomplete TU. This can entail that the data will be written in the incomplete TUs at a reduced speed (e.g. reduced write speed) but make more storage capacity available for portions of the data. It should be noted that, in some embodiments, even with a reduced performance (e.g., reduced write rate, reduced rate of storing data) due to a number of defective blocks in a TU reducing the number of parallel operations that can be performed in the TU, in some cases, writing data in SLC mode can still be performed more rapidly than writing data in TLC mode. For example, if in an embodiment writing data to a complete TU in SLC mode is four times faster than writing data to a complete TU in TLC mode, then even if a majority of the blocks in an incomplete TU are defective, data can still be written more quickly to the incomplete TU in SLC mode than to a complete TU in TLC mode. In this case, if 75% of the blocks in the incomplete TU are defective (i.e., 25% of the blocks in the incomplete TU are usable orphaned blocks), then the rate at which data can be written in the incomplete TU in SLC mode will be approximately equal to the rate at which data can be written in a complete TU in TLC mode. It should be understood that the relationship between the rates of data being written in complete or incomplete TUs and in SLC or respective MLC modes can vary based on implementation. Nevertheless, there will be cases where despite a performance loss due to reduced parallelism, the rate of writing data on incomplete TUs at a lower logical level operation mode is higher than the rate of writing data on complete TUs at a higher logical level operation mode.

Due to over-provisioning, some memory devices 130 may have more storage capacity (as determined based on operating in the highest logical level operation mode) that is greater than their nominal maximum capacity. In these cases, some of the excess capacity that is reserved for over provisioning and defects can be configured to be used in a lower logical level operating mode (i.e. resulting in a smaller number of bits recorded per cell) to increase performance. Furthermore, in some embodiments the amount of defective blocks and incomplete TUs can be known before the performance of any operations on memory device 130 and can be determined by MSC 113 as read/write operations are performed. Accordingly, in some cases, as data is written to memory device 130 MSC 113 can use the excess capacity to form new complete TUs can be formed using orphaned blocks from incomplete TUs. Accordingly, it is possible to store, on memory device 130, an amount of data that is greater than the nominal maximum capacity of the device. For example, a memory device 130 capable of operating in TLC mode and SLC mode can be configured to be 20% over provisioned with the 20% more capacity than the maximum nominal storage capacity of the memory device 130 and include 10% more capacity to account for defective blocks (the capacity being measured in TLC mode as it is the highest logical level operation mode). In this case the device will have 1.30 times the maximum nominal amount. In such a scenario, even considering that writing an amount data in SLC mode uses 3 times more physical capacity than writing the same amount of data in TLC mode, even if an amount of data equivalent to the maximum nominal capacity of the memory device 130 is written to it some capacity will remain. Accordingly, some of the can be written in SLC mode without reducing the total amount of data that can be written to the memory device 130 below its maximum nominal capacity.

Moreover, to maximize the rate at which data is written on the device, some of the data (e.g., a first portion of data) can be written in complete TUs in SLC mode, some of the data (e.g., a second portion of data) can be written in incomplete TUs in SLC mode, and some of the data (e.g., a third portion of data) can be written in complete TUs in TLC mode. Furthermore, because in the course of operation (e.g., while data is being written) the memory device 130 it can be determined that excess capacity remains (as measured for data being written to full TUs in TLC mode) that excess capacity can be configured to have data be written in it at a faster rate to full TUs in SLC mode (i.e., making it so that a portion of the data that would have been written to excess full TUs in TLC mode is written to full TUs in SLC in addition to the full TUs available from overprovisioning).

Accordingly, in some embodiments, the MSC 113 can store (i.e., write) a first portion of data in complete TUs of the memory device 130 operating in a mode using the lowest number of logical levels per memory cell. The MSC 113 can also determine the number of incomplete TUs in the memory device after writing the first portion of the data. So that incomplete TUs are not wasted and optimal use is made of writing data at a low logical level operating mode, the MSC 113 can also write a second portion of the data in incomplete TUs of the memory device 130 operating in a mode using the same low number of logical levels per memory cell. Furthermore, the MSC 113 can write a third portion of the data in complete TUs of the memory device 130 operating in a mode using a higher number of logical levels per memory cell.

In some embodiments, the MSC 113 can adjust the size of the second portion of data, based on the maximum storage capacity of the memory device 130 (with its nominal maximum capacity being considered together with any capacity allotted for overprovisioning and defective blocks), that minimizes the total time used to write the first portion of the data, the second portion of the data, and the third portion of the data. It should be understood that the rate at which the MSC 113 can write the second portion of the data in each incomplete TU using the lowest number of logical levels per memory cell can become lower (i.e., slower) than the rate of writing the third portion of the data in each complete TU using the higher number of logical levels per memory cell after a threshold number of defective blocks present in each incomplete TU is reached. As in the example described above where writing using SLC mode is four times faster than writing in TLC mode, the threshold amount of defective blocks is 75% of the number of blocks in a TU. However, this amount can vary depending on the proportional difference in storage rates (i.e., write speed) between the respective logical level operating modes. Accordingly, to maintain a maximum rate of writing the data, MSC 113 can begin to write the third portion of the data when the rate of writing the data in incomplete TUs using the lowest number of logical levels per memory cell becomes lower (i.e., slower) than the rate of writing the data in complete TUs using the higher number of logical levels per memory cell.

In some embodiments, the MSC 113 can detect defective blocks and increase the size of the second portion of the data as additional defective blocks are detected. Since the detection of defective blocks entails the presence of additional usable orphan blocks, the usable blocks can be used to create additional TUs with a maximum number of usable blocks so that the TUs can be used for writing the second portion of the data. Furthermore, since during the operation of the device 130 additional complete TUs can be created from the usable orphan blocks in incomplete TUs, the MSC 113 can also determine the amount of complete TUs available on the memory device and adjust the size of the first portion based on the determined amount of available complete TUs while writing the first portion of the data.

In other embodiments the MSC 113 can detect orphan blocks in the TUs of the memory device 130. Detection of orphan blocks can be based on a reference to metadata that tracks association of blocks and respective TUs (e.g. super blocks) and an identification of TUs with defective blocks associated with them. In response to detecting one or more orphan blocks, the MSC 113 can reconfigure a composition of one or more TUs on the memory device 130 using orphan blocks from incomplete super blocks to generate a maximal number of complete super blocks on the memory device 130. It should be understood that reconfiguring a composition of the TUs can include replacing a reference to an unusable block of a plane of the memory device 130 with a reference to a usable block in the plane.

During the operation of the memory device 130, in some embodiments, additional complete TUs can be created (as reconfigured TUs) from blocks previously included in an incomplete TU, and consequently additional capacity can become available for data to be written in SLC mode. Thus, in some embodiments, the portion of the data that would have been written in complete TUs in, for example, TLC mode can be further have a sub-portion be taken and written in the newly reconfigured TUs in SLC mode (i.e., if this sub-portion of data is considered independently as a second portion of data, the total amount of data can then be considered to be broken up into four portions). Accordingly, the size of this second portion can increase as additional orphan blocks are detected. In other embodiments, the maximum number of complete TUs is created initially from the available usable blocks on the memory device 130. In those embodiments, if some of the blocks in the complete TUs become defective or otherwise unavailable, they can be replaced with orphan blocks from incomplete TUs to maintain the number of complete TUs initially created.

Therefore, in some embodiments, the MSC 113 can write (i) the first portion of the data in complete TUs on the memory device 130 operating in a mode using a lowest number of logical levels per memory cell, (ii) the second portion of the data in the reconfigured TUs on the memory device 130 operating in a mode using the same lowest number of logical levels per memory cell, (iii) the third portion of the data in incomplete TUs on the memory device 130 operating in a mode using the same lowest number of logical levels per memory cell, and (iv) the fourth portion of the data in the remaining complete TUs on the memory device 130 operating in a mode using a higher number of logical levels per memory cell.

In these other embodiments, the MSC 113 can begin writing the third portion of the data when a rate of writing the data in incomplete TUs using the lowest number of logical levels per memory cell becomes lower (i.e., slower) than the rate of writing the data in complete TUs using the higher number of logical levels per memory cell. Because in some embodiments, the excess capacity of the memory device 130 can be significantly smaller than the maximum nominal capacity of the memory device 130, the fourth portion of data (i.e., the portion of data that is to be written in the higher logical level operating mode) can be larger than the first portion, second portion, and third portion combined.

Figure 3A:
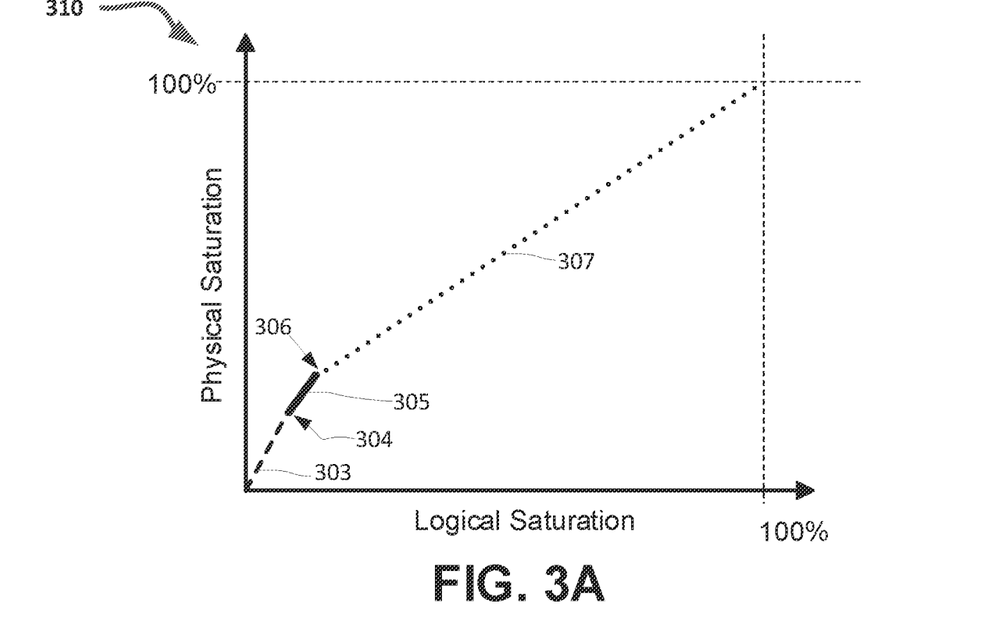
FIG. 3A depicts a graph of a memory device saturation in accordance with some embodiments of the present disclosure.
Figure 3B:
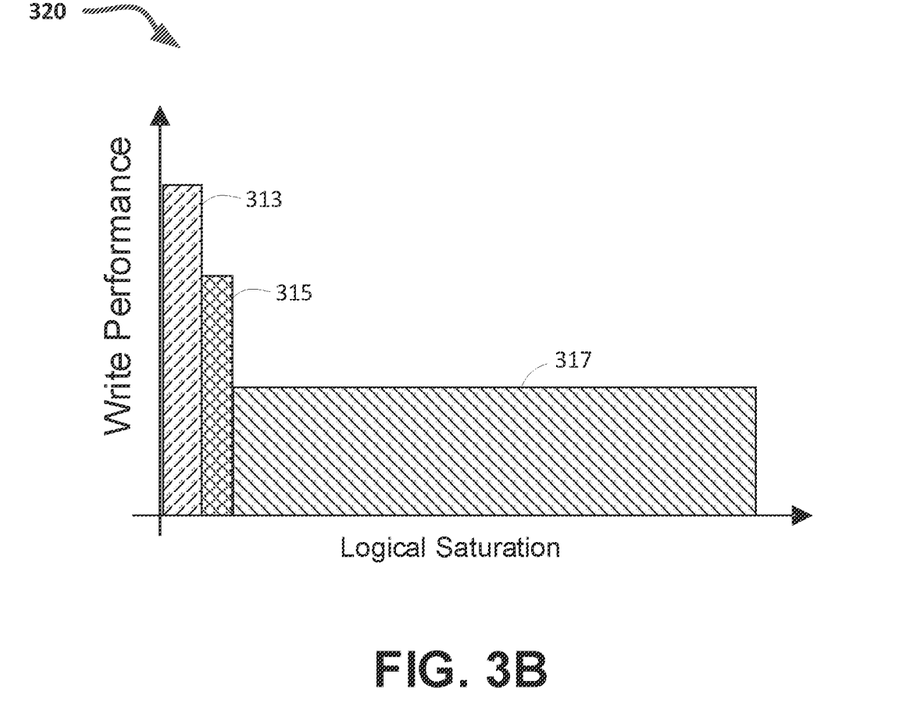
FIG. 3B depicts a graph of a memory device write performance in accordance with some embodiments of the present disclosure.

FIG. 3A depicts a graph of a memory device saturation showing the relationship between physical saturation (i.e., the portion of physical locations on the memory device that contain data) and logical saturation (i.e., the portion of logical block addresses (LBAs) that contain data) and FIG. 3B depicts a graph of a memory device write performance (i.e., rate of data being written to a memory device) as data is written to a memory device in accordance with the embodiments of this disclosure. Segment 303 and bar 313 each respectively correspond to the portion of data being written to complete TUs using the lowest number of logical levels per memory cell (e.g., writing to full super blocks in SLC mode). Similarly, segment 305 and bar 315 each respectively correspond to the portion of the data being written to incomplete TUs using the lowest number of logical levels per memory cell (e.g., writing to incomplete super blocks in SLC mode). Analogously, 307 and bar 317 each respectively correspond to the portion of data being written to complete TUs using the higher number of logical levels per memory cell (e.g., writing to full super blocks in TLC mode).

As can be seen, the highest rate of physical saturation and as well as the highest write performance (i.e., rate of data being written on the memory device) occurs when data being written to complete TUs using the lowest number of logical levels per memory cell. Then, when, at point 314, the data begins being written to incomplete TUs using the lowest number of logical levels per memory cell, both the rate of physical saturation and write performance both decrease due to the effect that defective blocks have on the ability to achieve full parallelism (i.e., due to the decreased number of concurrent parallel operations that can be performed on a TU having defective blocks). However, both the rate of physical saturation and write performance are higher at this stage than the subsequent stage which begins at point 306. At point 306, the data begins being written to complete TUs using the higher number of logical levels per memory cell, and, consequently both the rate of physical saturation and write performance drastically decrease due to the increased tProg caused by operations using a higher number of logical levels per memory cell. This stage continues until the memory device reaches complete logical saturation (i.e., is filled to its maximum capacity). In this manner, by writing portions of data using the lowest number of logical level in both complete and incomplete TUs, a higher rate of data being written (i.e., write speed) can be provided on the memory device. Accordingly, the embodiments of the present invention can maximize the amount of data written at the maximum rate on the memory device.

Figure 4:
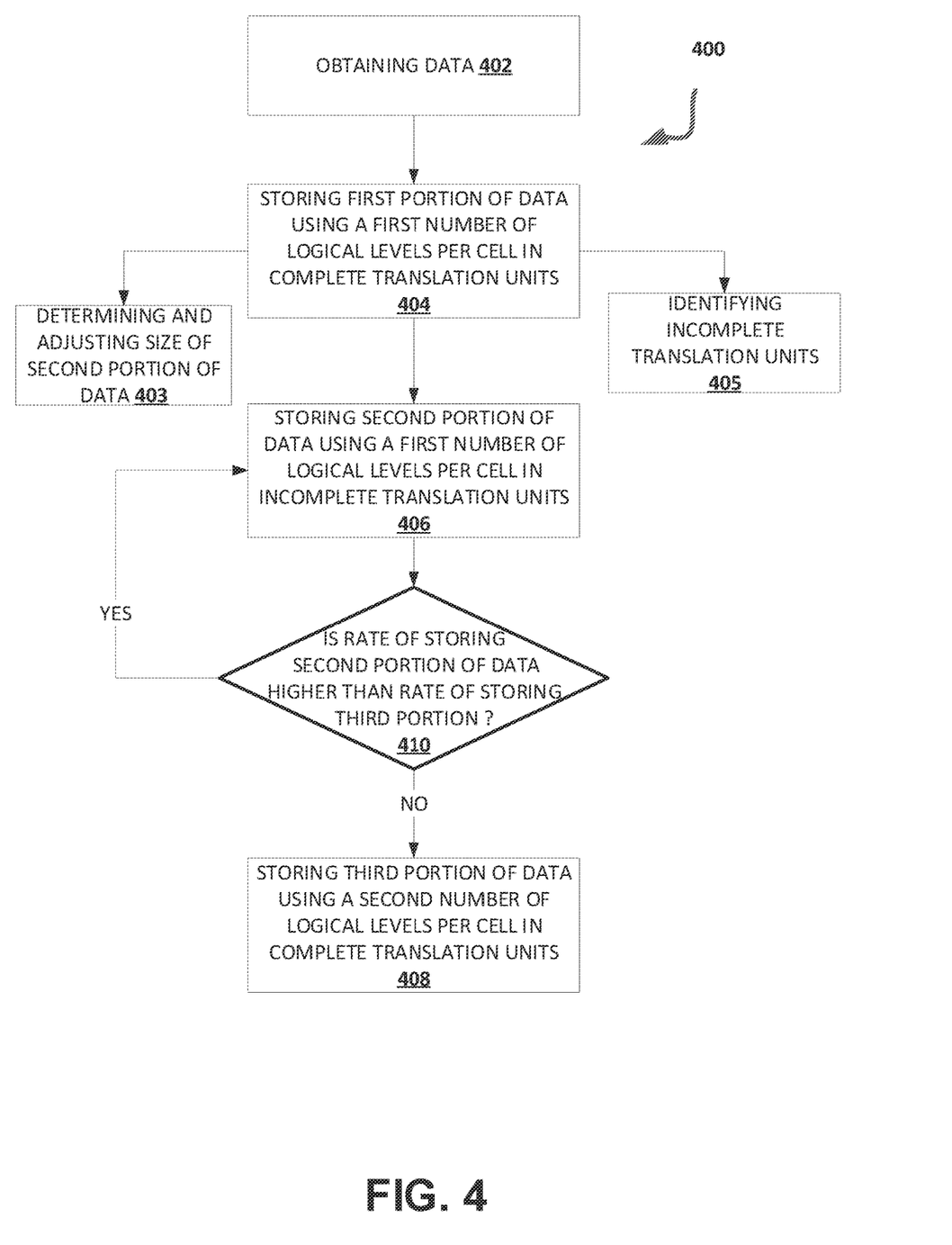
FIG. 4 is a flow diagram of an example method for performing write operations on a memory device in accordance with some embodiments of the present disclosure.

FIG. 4 is a flow diagram of an example method 400 for performing write operations on a memory device, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the MSC 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 402, the processing logic can receive data sent from host system 120 or from other components of the memory sub-system 110 to be written on the memory device 130. The processing logic can divide this data into multiple portions with each portion being of varied and adjustable sizes (the size of each portion being adjusted according to the operative mode e.g., SLC, TLC, etc. with which it is intended to be written) and configured to be written on the memory device 130 using various numbers of logical levels per cell. The processing logic can also determine the TUs and blocks on the memory device 130 where the portions of the data are to be written.

At operation 404, the processing logic can write a first portion of data in complete TUs of the memory device 130 operating in a mode using the lowest number of logical levels per memory cell. At operation 405, the processing logic can determine the number of incomplete TUs in the memory device. The processing logic can determine the number of incomplete TUs using the known number of complete TUs, available usable blocks, and the total number of blocks on the memory device 130. This determination can be made considering that, in some embodiments, the incomplete TUs on memory device 130 can be configured to have as many usable blocks as possible. Using the determined number of incomplete TUs, the processing logic can, at operation 403, determine or adjust the size of the second portion of the data.

Consequently, in order to make the most use of the usable orphan blocks in incomplete TUs and of the higher rate of data storage (i.e., write speed) when operating in a mode using the lowest number of logical levels, the processing logic can, at operation 406, write the second portion of the data in incomplete TUs of the memory device 130 using the same lowest number of logical levels per memory cell. This portion of the data can continue to be written for as long as the rate of writing data in incomplete TUs using the lowest logical level operating mode remains higher than the rate of writing in complete TUs using a higher logical level operating mode. The processing logic can determine the rate at which data can be written to the memory device 130 using the number of complete and incomplete TUs available to be written to on the device and the number of usable blocks in each respective incomplete TU as well as the operating mode at which the data is to be written.

Accordingly, at operation 410, the processing logic can determine whether the rate of writing data in incomplete TUs using the lowest number of logical levels per memory cell is lower (i.e., slower) than the rate of writing the data in the complete TUs using the higher number of logical levels per memory cell. If the rate of writing data in incomplete TUs using the lowest number of logical levels per memory cell is determined to be lower than the rate of writing the portion of the data in the complete TUs using the higher number of logical levels per memory cell, then, at operation 408, the processing logic can write a third portion of the data in complete TUs of the memory device 130 operating in a mode using a higher number of logical levels per memory cell. This third portion of the data can continue to be written to the memory device 130 until the memory device is filled to capacity (i.e., reaches complete logical saturation).

Figure 5:
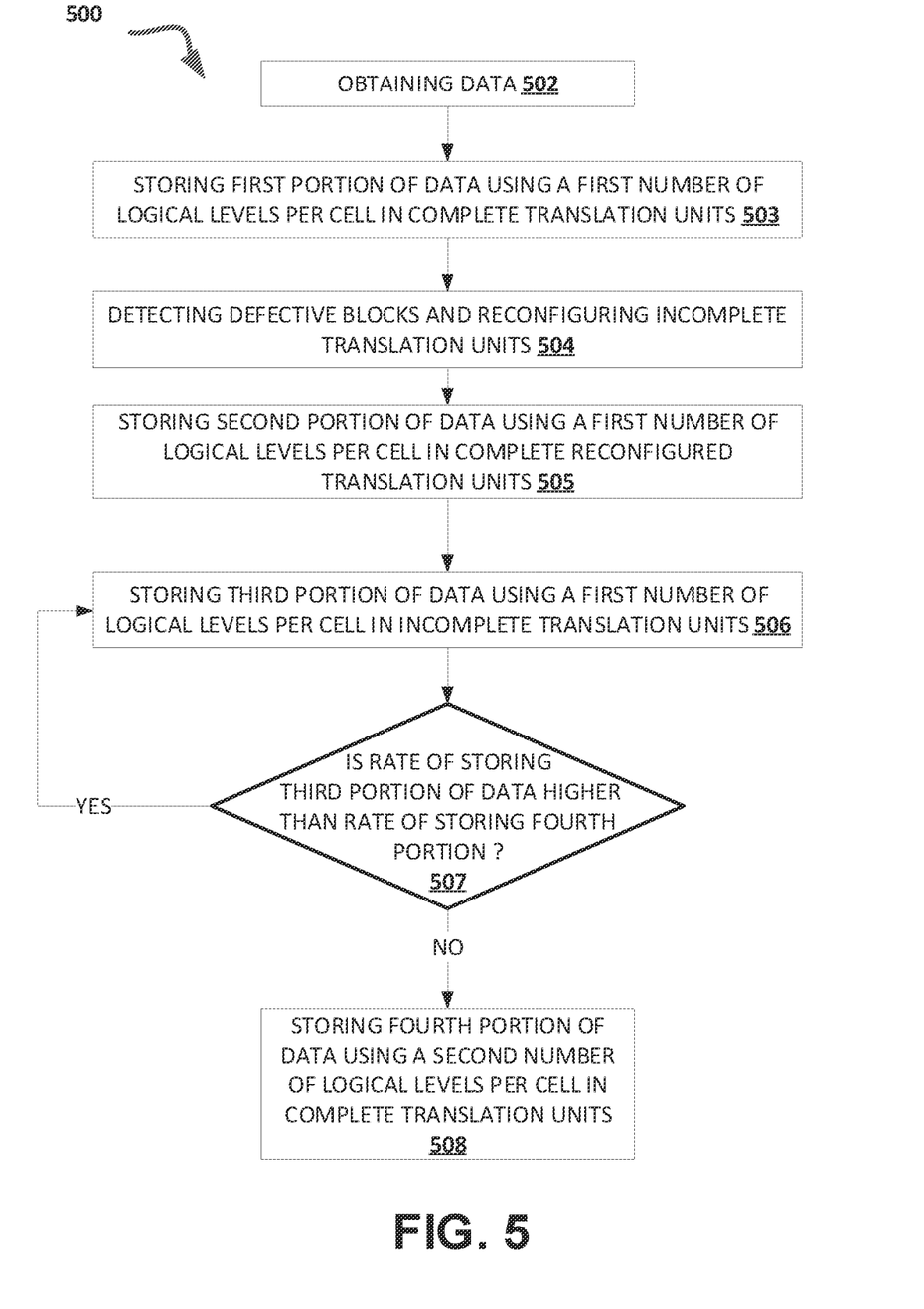
FIG. 5 is a flow diagram of an example method for performing write operations on a memory device in accordance with some embodiments of the present disclosure.

FIG. 5 is a flow diagram of another example method 500 to for performing write operations on a memory device, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the MSC 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing logic can obtain or receive data sent from host system 120 or from other components of the memory sub-system 110 to be written on the memory device 130. The processing logic can then, at operation 503, write a first portion of data in complete TUs of the memory device 130 operating in a mode using the lowest number of logical levels per memory cell.

At operation 504, the processing logic can detect defective blocks and orphan blocks in the incomplete TUs of the memory device 130. The processing logic can detect defective blocks and orphan blocks by referring to metadata associating each block to a respective TU. The processing logic can also reconfigure incomplete TUs into complete TUs as well as reconfigure incomplete TUs to have more usable blocks by reassigning usable blocks from other TUs that are more incomplete and therefore less valuable for the purposes of achieving maximum parallelism.

Consequently, at operation 505, the processing logic can write the second portion of the data in the TUs that have been reconfigured into complete TUs of the memory device 130 using the same lowest number of logical levels per memory cell. This second portion corresponds to the some part of the portion of the data that would otherwise have been written using a higher number of logical levels per memory cell but can be written faster using a lower number of logical levels per cell due to the presence of excess storage on the memory device 130.

At operation 506, the processing logic can write the third portion of the data in incomplete TUs of the memory device 130 again using the lowest number of logical levels per memory cell. This portion of the data can continue to be written for as long as the rate of writing data in incomplete TUs using the lowest logical level operating mode remains higher than the rate of writing in complete TUs using a higher logical level operating mode.

Accordingly, at operation 507, the processing logic can determine whether the rate of writing data in incomplete TUs using the lowest number of logical levels per memory cell is lower (i.e., slower) than the rate of writing the data in the complete TUs using the higher number of logical levels per memory cell. If the rate of writing data in incomplete TUs using the lowest number of logical levels per memory cell is determined to be lower than the rate of writing the portion of the data in the complete TUs using the higher number of logical levels per memory cell, then, at operation 508, the processing logic can write a fourth portion of the data in complete TUs of the memory device 130 operating in a mode using a higher number of logical levels per memory cell. This fourth portion of the data can continue to be written to the memory device 130 until the memory device is filled to capacity.

Figure 6:
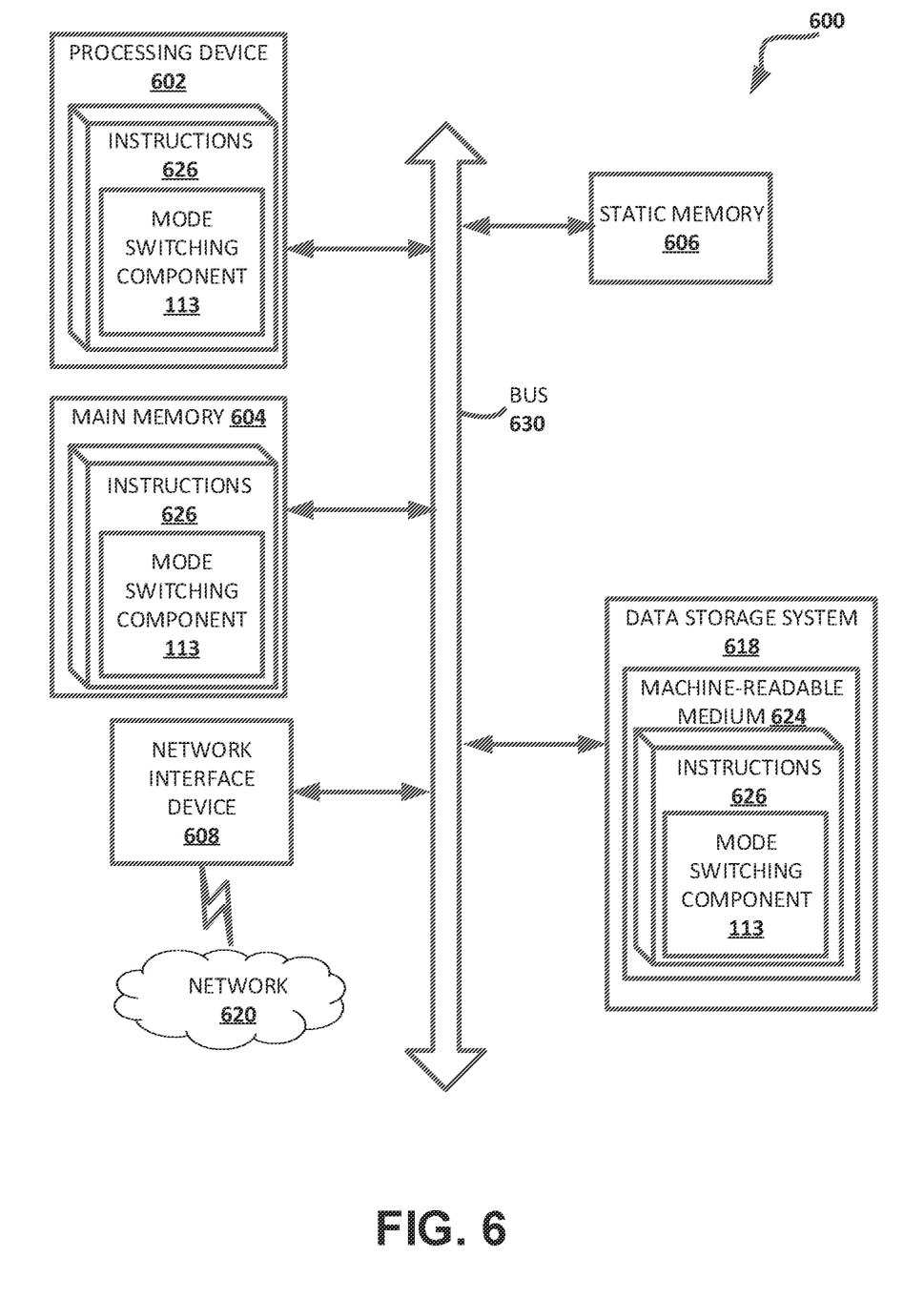
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the functionalities of MSC 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to an MSC (e.g., the MSC 113 of FIG. 1) and the methods 400 and 600 of FIGS. 4 and 5 respectively. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
writing a first portion of data to one or more complete translation units of the memory device using a first number of logical levels per memory cell;
writing a second portion of the data to one or more incomplete translation units of the memory device using the first number of logical levels per memory cell; and
writing a third portion of the data to one or more complete translation units of the memory device using a second number of logical levels per memory cell that exceeds the first number of logical levels per memory cell.

2. The system of claim 1, wherein the operations further comprise:
determining a number of incomplete translation units in the memory device after writing the first portion of the data for writing the second portion of the data.

3. The system of claim 1, wherein the operations further comprise:
adjusting, based on a maximum storage capacity of the memory device, a size of the second portion of data that minimizes a total time used to write the first portion of the data, the second portion of the data, and the third portion of the data.

4. The system of claim 1, wherein a rate of writing the second portion of the data in each incomplete translation unit using the first number of logical levels per memory cell becomes lower than the rate of writing the third portion of the data in each complete translation unit using the second number of logical levels per memory cell after a threshold number of defective blocks present in each incomplete translation unit is reached.

5. The system of claim 1, wherein the operations further comprise:
  detecting defective blocks and increasing a size of the second portion of the data as additional defective blocks are detected.

6. The system of claim 1, wherein the processing device begins writing the third portion of the data when a rate of writing the data in incomplete translation units using the first number of logical levels per memory cell becomes lower than the rate of writing the data in complete translation units using the second number of logical levels per memory cell.

7. The system of claim 1, wherein the operations further comprise:
  determining an amount of complete translation units available on the memory device and adjusting a size of the first portion based on the determined amount of available complete translation units while writing the first portion.

8. A method comprising:
  writing a first portion of data to one or more complete translation units of a memory device using a first number of logical levels per memory cell;
  writing a second portion of the data to one or more incomplete translation units of the memory device using the first number of logical levels per memory cell; and
  writing a third portion of the data to one or more complete translation units of the memory device using a second number of logical levels per memory cell that exceeds the first number of logical levels per memory cell.

9. The method of claim 8, further comprising determining a number of incomplete translation units in the memory device after writing the first portion of the data.

10. The method of claim 8, further comprising adjusting, based on a maximum storage capacity of the memory device, a size of the second portion of data that minimizes a total time used to write the first portion of the data, the second portion of the data, and the third portion of the data.

11. The method of claim 8, wherein a rate of writing the second portion of the data in each incomplete translation unit using the first number of logical levels per memory cell becomes lower than the rate of writing the third portion of the data in each complete translation unit using the second number of logical levels per memory cell after a threshold number of defective blocks present in each incomplete translation unit is reached.

12. The method of claim 8, further comprising detecting defective blocks and increasing a size of the second portion of the data as additional defective blocks are detected.

13. The method of claim 8, wherein writing the third portion of the data begins when a rate of writing the data in incomplete translation units using the first number of logical levels per memory cell becomes lower than the rate of writing the data in complete translation units using the second number of logical levels per memory cell.

14. The method of claim 8, further comprising determining an amount of complete translation units available on the memory device and adjusting a size of the first portion based on the determined amount of available complete translation units while writing the first portion.

15. A non-transitory computer-readable storage medium comprising instructions that, when executed by a processing device, cause the processing device to perform operations comprising:
  receiving data to be stored on a memory device;
  writing a first portion of the data in one or more complete translation units on the memory device using a first number of logical levels per memory cell;
  detecting one or more orphan blocks;
  responsive to the detection of the one or more orphan blocks, reconfiguring a composition of the one or more complete translation units on the memory device using orphan blocks from incomplete super blocks to generate a maximal number of complete super blocks on the memory device;
  writing a second portion of the data in the one or more reconfigured translation units on the memory device using the first number of logical levels per memory cell;
  writing a third portion of the data in one or more incomplete translation units on the memory device using the first number of logical levels per memory cell; and
  writing a fourth portion of the data in one or more remaining complete translation units on the memory device using a second number of logical levels per memory cell.

16. The non-transitory computer-readable storage medium of claim 15, wherein the instructions cause the processing device to begin writing the third portion of the data when a rate of writing the data in incomplete translation units using the first number of logical levels per memory cell becomes lower than the rate of writing the data in complete translation units using the second number of logical levels per memory cell.

17. The non-transitory computer-readable storage medium of claim 15, wherein reconfiguring a composition of the one or more translation units comprises replacing a first reference to an unusable block of a plane of the memory device with a second reference to a usable block in the plane.

18. The non-transitory computer-readable storage medium of claim 15, wherein a rate of writing the third portion of the data in each incomplete translation unit using the first number of logical levels per memory cell becomes lower than the rate of writing the fourth portion of the data in each complete translation unit using the second number of logical levels per memory cell after a threshold number of orphan blocks present in each incomplete translation unit is reached.

19. The non-transitory computer-readable storage medium of claim 15, wherein a size of the second portion increases as additional orphan blocks are detected.

20. The non-transitory computer-readable storage medium of claim 15, wherein the fourth portion is larger than the first portion, second portion, and third portion combined.

* * * * *